J. D. HALSTED.
Horse Hay Fork.
No. 41,155.
2 Sheets—Sheet 1.
Patented Jan. 5, 1864.
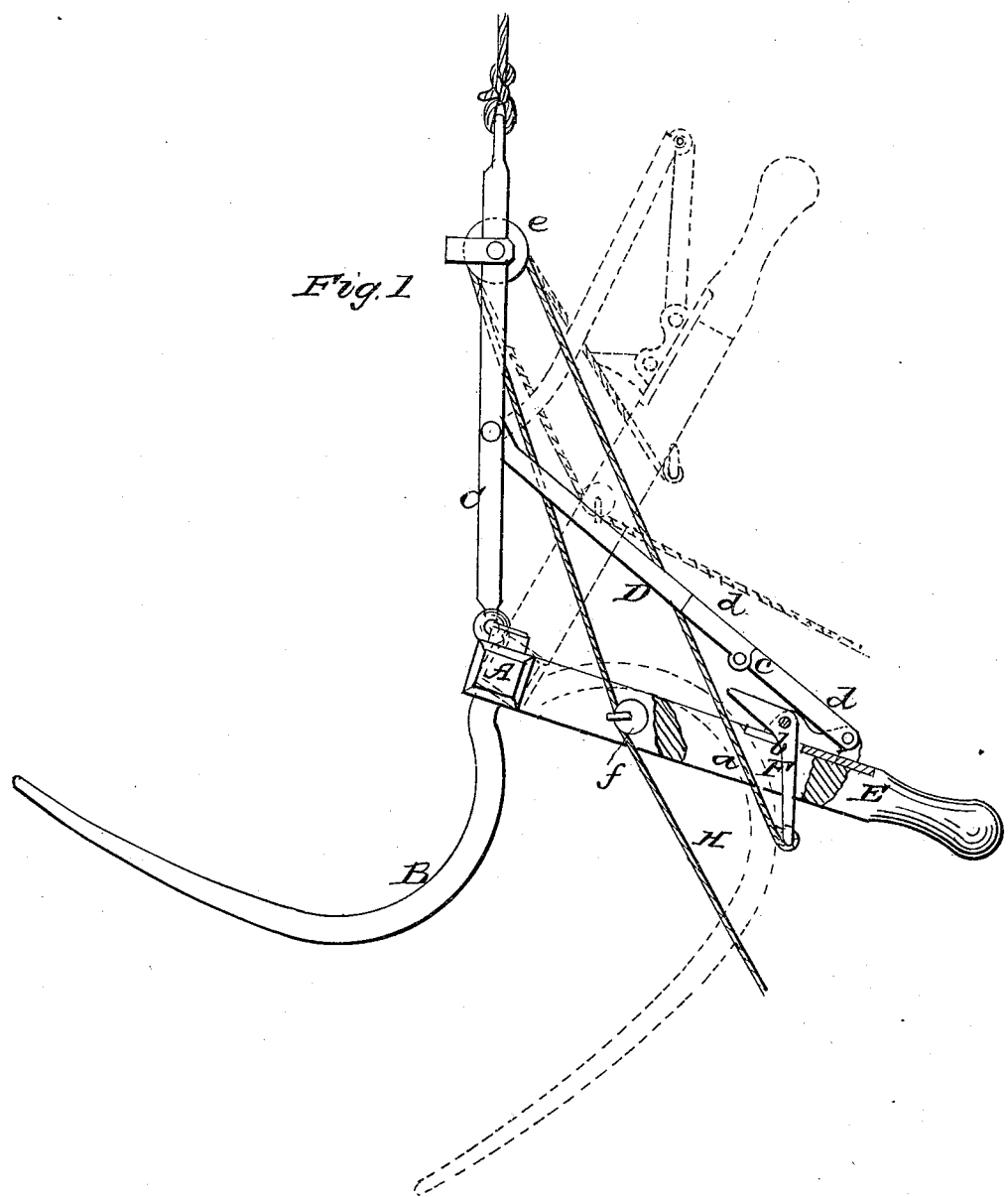
Witnesses.
Inventor
James D Halsted

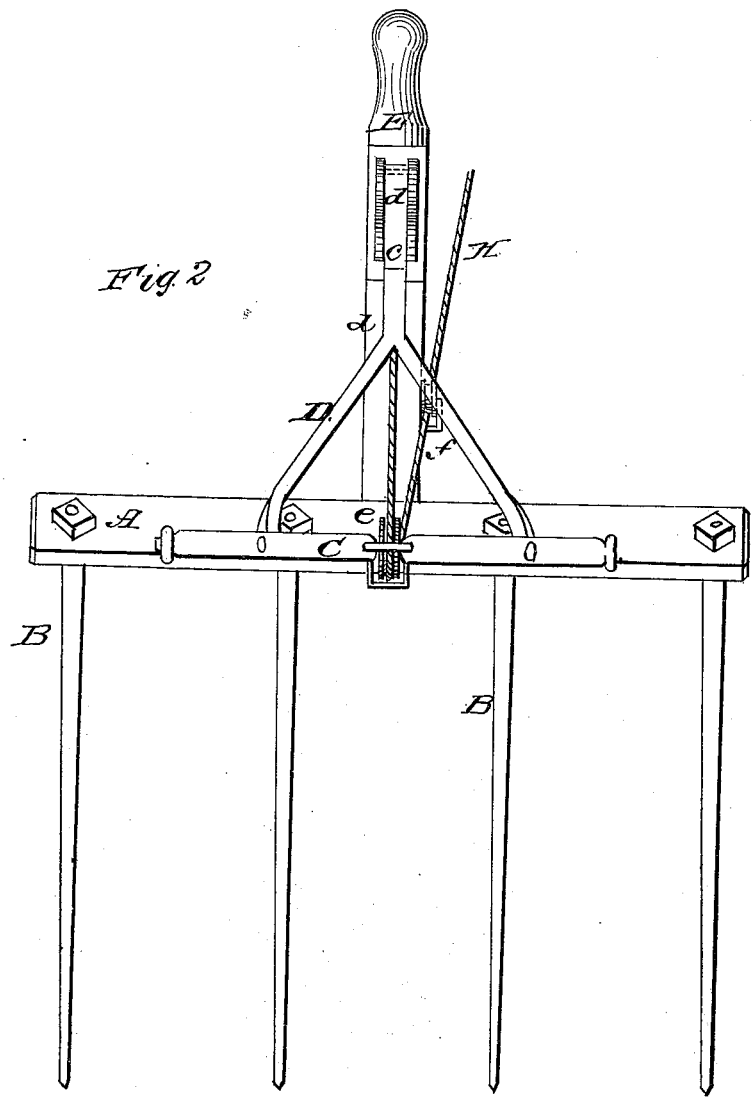

UNITED STATES PATENT OFFICE.

JAMES D. HALSTED, OF RYE, NEW YORK.

IMPROVEMENT IN HORSE HAY-FORKS.

Specification forming part of Letters Patent No. 41,155, dated January 5, 1864.

*To all whom it may concern:*

Be it known that I, JAMES D. HALSTED, of Rye, in the county of Westchester and State of New York, have invented a new and useful Improvement in Horse Hay-Forks; and I do hereby declare that the following is a full, clear, and exact description of the same, reference being had to the accompanying drawings, making a part of this specification, in which—

Figure 1 is a side view of a horse hay-fork, partly in section, with my improvement applied to it; Fig. 2, plan or top view of the same.

Similar letters of reference indicate corresponding parts in the two figures.

This invention relates to an improvement in horse hay-forks which are provided with toggle-joint bars—such, for instance, as may be seen in the hay-fork patented by Nelson Palmer September 30, 1862, and reissued March 3, 1863. This hay-fork is provided with a bail or sustaining-bar and a brace or toggle-joint bar, the latter serving to hold the fork in proper position while being elevated with its load, and admitting, when its joint is shoved out of line with the two parts or bars which it connects, of the load being discharged from the fork. This fork has been much used since it was introduced to the public, and has given general satisfaction, the only material objection urged against it being the effort required to actuate the toggle-joint bar in order that the fork may discharge its load.

The object of my invention is to obviate this difficulty; and to that end it consists in applying a lever to the fork in such a manner as to act against the toggle-joint bar and cause the latter with a quite inconsiderable effort on the part of the attendant or operator to be so moved or adjusted as to admit of the load being discharged.

To enable those skilled in the art to fully understand and construct my invention, I will proceed to describe it.

A represents the head; B, the tines; C, the bail or sustaining-bar; D, the brace or toggle-joint bar, and E the handle. These parts comprise the fork patented by Nelson Palmer, previously referred to, and therefore do not require a special description.

F represents a bent lever, which is fitted in a mortise, $a$, in the handle E, and works on a fulcrum, $b$. This lever F is so placed or disposed relatively with the toggle-joint bar D that the upper end of the former will, when its lower end is drawn toward the fork-head A, strike the toggle-joint bar D at or near its joint $c$ and throw said joint out of line with the two parts $d\ d$ of the bar, which it connects, and admits of the fork dropping to a vertical position in order that it may discharge its load, as shown in red in Fig. 1. The toggle-joint bar D, it will be seen, when adjusted in a straight position, as shown in black in Fig. 1, serves to retain the fork in or nearly in a horizontal position, so that it may retain its load while being elevated to the desired point, the hoisting-rope G being attached to the bail C.

The lever F is actuated by an attendant through the medium of a rope, H, which is attached to its lower end, and passes over a pulley, $e$, at the upper part of the bail C and behind a guide-pulley, $f$, in or at one side of the handle E. In the original fork of Palmer this rope H is attached directly to the toggle-joint bar D at a point near the joint $c$, and it will be seen that when the rope H is actuated considerable effort is required in order to force outward the joint $c$, as the pull of the rope is too near in line with the toggle-joint bar D. By means of the lever F this difficulty is entirely obviated, the toggle-joint bar being actuated with a very slight pull of the rope H.

I do not confine myself to the precise position or arrangement of the lever F as herein shown, for it may be varied in different ways and the same end attained. Neither do I confine my invention and improvement to the Palmer fork, as others may have a toggle-joint bar differently arranged.

Having thus described my invention, what I claim as new, and desire to secure to Letters Patent, is—

The employment or use in a horse hay-fork provided with a brace or toggle-joint bar, D, of a lever, F, arranged in relation with the toggle-joint bar to operate in the manner substantially as and for the purpose herein set forth.

JAMES D. HALSTED.

Witnesses:
THOS. L. J. DOUGLAS,
D. ROBERTSON.